INVENTOR.
WELCOME W. BENDER JR.
PEYTON M. MAGRUDER
George Douglas Jones
ATTORNEY Patented June 8, 1948

2,443,045

UNITED STATES PATENT OFFICE 2,443,045

STRAIN GAUGE CENTER OF GRAVITY AND GROSS WEIGHT METER

Peyton M. Magruder, Baltimore, and Welcome W. Bender, Jr., Towson, Md., assignors to The Glenn L. Martin Company, Middle River, Md., a corporation of Maryland Application March 9, 1944, Serial No. 525,652

4 Claims. (Cl. 73—65)

1

This invention relates to structure and instruments to be adapted to any airplane whereby the center of gravity and gross weight of the airplane may be measured on the ground prior to take-off.

Anyone familiar with the clumsy expedients employed in taking weight readings of loaded aircraft prior to flight and the elaborate weight calculations necessary to determine important parameters of the airplane's performance before flight will appreciate the advantages of having a self-contained direct reading instrument whereby the center of gravity and gross weight can readily be determined without the usual expedients employed and a ground crew of several men.

By this invention a self-contained instrument is provided whereby gross weight and center of gravity can be determined prior to flight.

A further object of this invention is the provision of an instrument that can readily be adapted to almost any airplane with no structural change.

Further and other objects will become apparent from the description of the accompanying drawings which form a part of this disclosure and in which like numerals refer to like parts.

Figure 1:
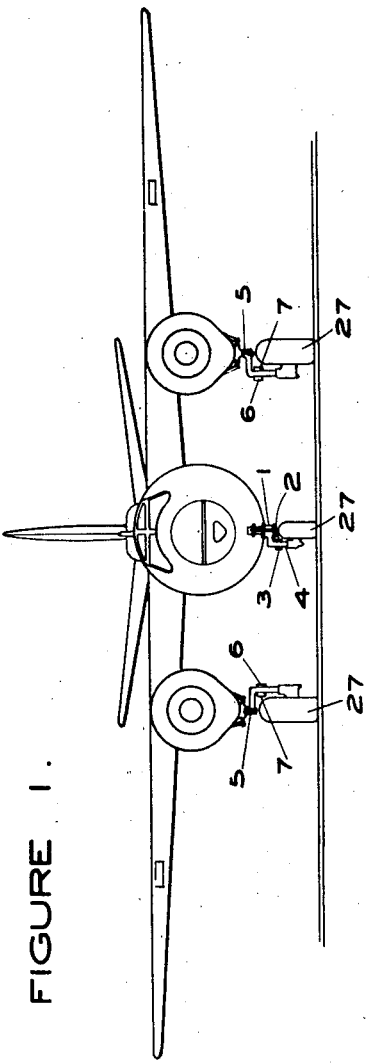
Figure 1 shows a front elevation of an airplane with invention attached.
Figure 2:
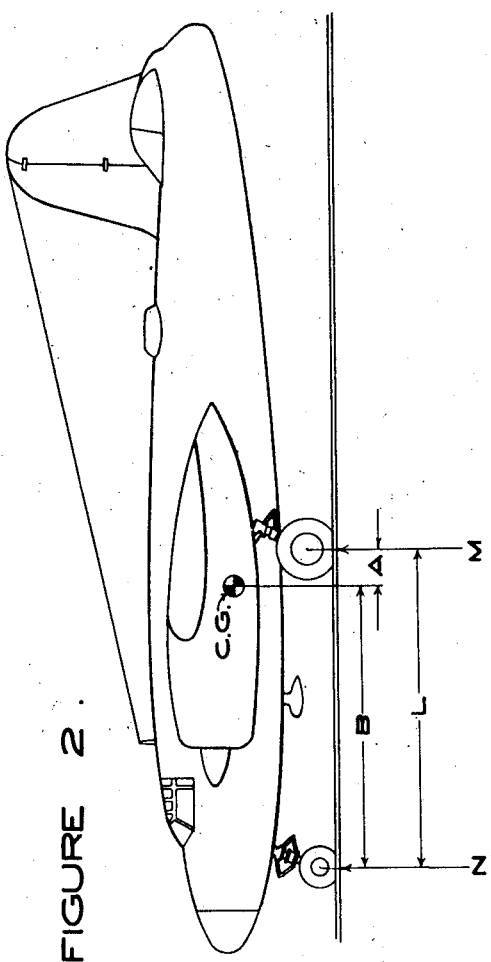
Figure 2 is a side elevation explanatory of this invention.

Figures 1 and 2 of the drawing illustrate a conventional airplane having a tricycle landing gear system. Nose wheel strut 1 has secured thereto strain gauges 2 and 3 on that portion of the strut 4 bearing a direct load of the airplane. Main landing gear struts 5 have strain gauges 6 and 7 mounted in a similar manner. The signals produced by these electric strain gauges mounted on the landing gear struts in a particular fashion actuates a meter or indicating device whose scale is calibrated in terms of gross weight and center of gravity location. The strain gauges employed are preferably of the metalectric type which are of bonded resistance wire and are mounted, cemented or otherwise suitably attached to the part of the landing gear strut in such a way that their resistance varies in proportion to the vertical

2 load supported by each structure. In the case of the conventional tail wheel type airplane gauges can be attached either to the tail wheel mechanism or some part of the aft fuselage structure whose stress varies substantially in comparison to the vertical load on the tail support mechanism.

Figure 3:
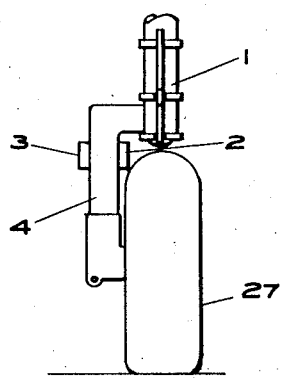
Figure 3 shows a single wheel landing gear strut with the invention attached.
Figure 5:
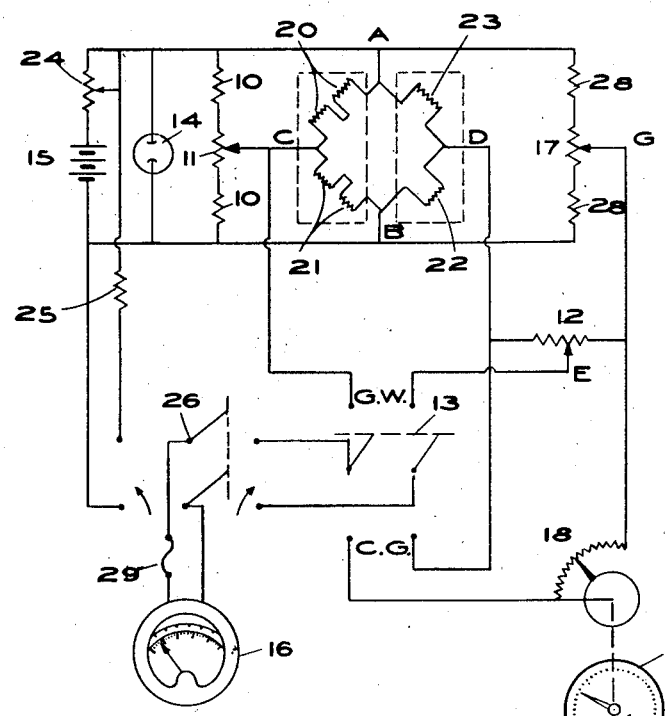
Figure 5 shows the circuit diagram of the invention.

Figure 3 shows an enlarged view of the nose wheel and strut which is also typical of the main landing gear. Strain gauges 2 and 3 are attached to the portion 4 which is subject to a bending stress due to vertical loading on the wheel 27. Gauge 3 is mounted on the tension side and gauge 2 is mounted on the compression side of the strut. These gauges are wired in adjacent arms AC and CB respectively of a Wheatstone bridge circuit as shown in Figure 5 so that the bridge balance is changed by differential strains in the strut due to bending, but is unaffected by the uniform strains due to axially loading or more especially due to temperature changes. Arm AC of the bridge contains the tension gauges 20 on both main gear struts wired in series. While arm BC contains the compression gauges 21 on both struts wired in series.

Figure 4:
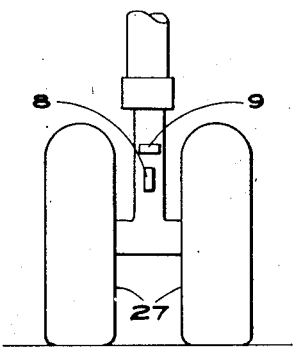
Figure 4 shows a double wheel landing gear with the strut attached.

In the case of a vertical strut not subject to bending, as for instance a vertical strut on a large airplane supported by two wheels 27 as shown in Figure 4, temperature compensation is accomplished by mounting one gauge 8 parallel to the principal stress and a gauge 9 perpendicular to it as shown in Figure 4. Gauge 8 is the compression gauge while gauge 9 is the tension gauge. By reason of Poisson's ratio of strain in an elastic body these gauges will react differently to axial loads on the strut and thereby change the balance of the bridge but they will react uniformly due to strains produced by temperature changes and will thereby not effect the bridge balance.

By the arrangement of the gauges described above for the two types of struts, temperature effects which might otherwise seriously discount the usefulness of this device by impairing its accuracy are reduced to a negligible quantity in that the arrangement of the gauges in the bridge renders it compensating for temperature changes.

With either arrangement of gauges, the gauges from both main gear struts are wired in series in arm AC and BC of the bridge as shown in Figure 5, in order to obtain a bridge output proportional to the sum of the loads on the main gears regardless of the lateral asymmetry of the airplane load. Gauges are also mounted on the nose gear or tail gear as the case may be and are similarly compensated for temperature and connected into arms AD and BD of the bridge circuit. Tension gauge 22 is wired in arm BD and compression gauge 23 in arm AD. It is evident from bridge circuit theory that a small variation of resistance in arm AC is equivalent to a similar small variation in arm BD in that both produce similar unbalanced voltages across the bridge, and their effect is additive. Therefore, the unbalanced voltage appearing across CD is proportional to the sum of the effect produced by gauges 20 on the main gear and gauges 22 on the nose gear or the unbalanced voltage is equal to (M+N).

The bridge circuit ABCD shown in Figure 5 is provided with suitable balance resistors 10 and potentiometer 11 which is adjustable to balance the bridge in some fixed or reference loading of the strain gauges, as for instance during flight where there is no load on the main landing gear, or on the ground when the ship is jacked up and the landing gear is free of load.

The airplane gross weight is equal to the sum of the weights supported by the main gear struts and the nose gear strut, but since the geometrical proportions of the nose gear are in general not identical with those of the main gear struts, it it not likely that strain gauges mounted on the nose gear strut will have the same rate of change of resistance with vertical load as the gauges mounted on the main gear struts. Therefore, if the bridge signal response is to be made proportional to the sum of the three vertical loads, means must be provided for adjusting the sensitivities of the various gauges to some uniform value in terms of the vertical load being supported by the respective struts.

For the purpose just stated, a potentiometer 12 is provided for adjusting the sensitivity of the nose strut gauges on the bridge output, measured across points C and E when the switch 13 is in the "up" or "gross weight" position. Potentiometer 12 is adjusted during initial installation and calibration of the device. It is set at a position which will produce the same deflection of the meter, for a 1000 pound "up" load on the nose gear, as is produced by a 1000 pound "up" load on the main gear. In the event of any appreciable manufacturing dissymmetry of the two main gear struts, similar potentiometers can be installed across legs AC and AB to allow balance of the sensitivity of both main gear struts, though this is hardly likely to be necessary.

The scale of meter 16 is calibrated in terms of gross weight of the airplane, and for practical cases need only cover the range between weight empty and maximum gross weight of the airplane.

Since the sensitivity of any bridge circuit is proportional to the applied voltage across AB, this voltage must be held substantially constant if the meter calibration in gross weight is to be read directly. Therefore, a suitable neon glow lamp 14 or other voltage regulator is wired into the circuit to maintain the potential across AB even though the voltage of the electric power source 15, of Figure 5, varies in the normal operation of the airplane. A potentiometer 24 is included for coarse adjustment of battery voltage. A further suitable resistor 25 is included together with switch 26 to provide a means for checking the bridge voltage on the meter 16, the circuit of which contains fuse 29. The adjustment of the bridge voltage is accomplished by variable resistors 24.

The method of determining the center of gravity position can best be explained by reference to Figure 2 before studying further features of the circuit of Figure 5. As seen in the Figure 2, the gross weight is again the sum of forces M and N, M representing the vertical force on the main gear, and N the vertical force on the nose gear.

The fore and aft position of the center of gravity can be defined as the ratio A/L, since L is a fixed constant length dependent upon the airplane's geometry. Now, since for equilibrium of the airplane, the sum of the moments about the center of gravity is zero, $$MA - NB = 0 \qquad (1)$$

now substituting $B = L - A$ in this equation and transposing, we obtain $$MA = N(L-A) = NL - NA \qquad (2)$$

transposing again we obtain $$MA + NA - NL = A(M+N) \qquad (3)$$

Now solving Equation 3 for A/L we obtain finally $$A/L = N/(M+N) \qquad (4)$$

Thus it has been shown that the center of gravity is directly proportional to the load on the nose gear and inversely proportional to the gross weight.

With these relations in mind, the center of gravity features of the circuit of Figure 5 have been designed. With the double pole, double throw switch 13 in the "down" or "center of gravity" position, the meter reading is proportional to the load on the nose gear. Potentiometer 17 is adjusted with no load on the nose gear strut during initial balancing and calibration of the secondary bridge ABDG, which contains the arms 20 and the gauge arms AD and BD.

In order to correct the meter reading for the effect of gross weight in Equation 4, the variable resistor 18 of a potentiometer type is included in the circuit. This variable resistor adjusts the resistance in the meter circuit which results in a proportional variation of current in the meter circuit produced by the unbalanced voltage across DG. In other words it adjusts the meter sensitivity to compensate for gross weight when measuring center of gravity. A dial 19 is provided for adjusting potentiometer 18 as shown, and the scale of this dial is calibrated in terms of gross weight.

Now in order to measure the center of gravity, after the gross weight has been determined as described above, the pointer of potentiometer 18 is set to this gross weight on the dial 19 of potentiometer 18 and the switch 13 is thrown to the center of gravity position. The center of gravity position is then read from the meter 16 on a suitably designated auxiliary scale. This scale is calibrated in terms of A/L or as is customary in defining the center of gravity, in terms of percent of the mean aerodynamic wing chord, or in any other convenient units.

It is further pointed out in the operation of the potentiometer 18 that the meter circuit resistance varies approximately with the gross weight setting of the dial of potentiometer 18. Thus for large gross weights, the meter circuit resistance is large, and its sensitivity small, while for small gross weights the opposite is true. Thus the effect of gross weight is compensated by potentiometer 18 and the center of gravity is directly proportional to the meter reading which is in turn proportional to the nose gear load.

In considering the practicability of this invention, it must be pointed out that the strain gauges must be designed to carry the current required and yet have sufficiently high and constant sensitivity over a reasonably long period of time to make the device useful in airplane operation.

It has been pointed out above that this device can be used with only slight modifications to measure lateral position of the center of gravity if it becomes important or useful to do so, as for instance in an unsymmetrically loaded freight carrying airplane.

The term "meter" used in this specification means not only the conventional moving pointer indicator but also any form of measuring device such as a bridge balancing potentiometer or sensitive galvanometer.

It is to be understood that certain changes, alterations, modifications and substitutions can be made without departing from the spirit and scope of the appended claims.

We claim as our invention:

1. In an airplane having strut-supported tricycle landing gear, metalectric strain gauges mounted on said struts and so arranged on each strut that one gauge measures the load and one gauge compensates for temperature on that strut, said strain gauges being secured to a portion of the strut which is subject to strain in supporting its share of the weight of the airplane and load, an electric bridge circuit generally of the Wheatstone type including said strain gauges and a meter, the main landing gear strain gauges connected in two adjacent arms of said bridge with similarly stressed gauges connected in series in each arm, gauges on the third landing gear strut connected in bridge arms with similarly stressed gauges in arms opposite those of said main landing gear, said strain gauges being so connected that the bridge output voltage is proportional to the sum of the strain gauge changes in resistance, said meter being connected to measure the output voltage across the junction between the arms of the bridge in which the main landing gear gauges are connected and the junction of the arms in which the gauges of the third landing gear are connected to give an indication proportional to gross weight.

2. In an airplane having strut-supported tricycle landing gear, metalectric strain gauges mounted on said landing gear assembly with one gauge arranged parallel to the principal stress in the landing gear for measuring load and one gauge arranged on the landing gear for temperature compensation, an electric bridge circuit generally of the Wheatstone type including said strain gauges and a meter, the main landing gear strain gauges connected in two adjacent arms of said bridge with similarly stressed gauges connected in series in each arm, gauges on the third landing gear connected in bridge arms with similarly stressed gauges in arms opposite those of said main landing gear, said strain gauges being so connected that the bridge output voltage is proportional to the sum of the strain gauge changes in resistance, said meter being connected to measure the output voltage across the junction between the arms of the bridge in which the main landing gear gauges are connected and the junction of the arms in which the gauges of the third landing gear are connected to give an indication proportional to gross weight.

3. In an airplane having strut-supported tricycle landing gear, metalectric strain gauges mounted on said struts and arranged, one parallel with, and one transversely of the principal stress to compensate for variations in temperature, said strain gauges being secured to a portion of the strut which is subject to strain in supporting its share of the weight of the airplane and load, an electric bridge circuit generally of the Wheatstone type including a meter to which said strain gauges are connected, the main landing gear strain gauges connected in two adjacent arms of said bridge with similarly stressed gauges connected in series in each arm, gauges on the third landing gear connected in opposite bridge arms, said strain gauges being so connected that the bridge output voltage is proportional to the sum of the strain gauge changes in resistance which will give an indication of the gross weight on the meter.

4. In an airplane having strut-supported tricycle landing gear of the type having the third gear on the opposite side of the center of gravity from the main landing gear, metalectric strain gauges secured to each strut with one gauge arranged for measuring load and one gauge arranged for temperature compensation, said strain gauges being secured to a portion of the strut which is subject to strain in supporting its share of the weight of the airplane and load, an electric bridge circuit of the Wheatstone type, including said strain gauges and a meter, said bridge having said strain gauges of the third gear connected in said bridge circuit in adjacent arms of said bridge, said meter connected to the junction between said gauges and the junction between the opposite arms of said bridge to indicate unbalance of the bridge due to the load on said third gear, a variable resistance means in said meter circuit to introduce a predetermined amount of resistance proportional to the gross weight of the airplane to adjust the sensitivity of the meter circuit for a known gross weight to give an indication of center of gravity on said meter.

PEYTON M. MAGRUDER.
WELCOME W. BENDER, JR.

REFERENCES CITED

The following references are of record in the file of this patent:

UNITED STATES PATENTS

| Number | Name | Date |
|---|---|---|
| 1,407,078 | Murray | Feb. 21, 1922 |
| 1,864,876 | Westrum | June 28, 1932 |
| 2,316,975 | Ruge | Apr. 20, 1943 |
| 2,373,504 | Schlieban et al. | Apr. 10, 1945 |

FOREIGN PATENTS

| Number | Country | Date |
|---|---|---|
| 387,887 | Great Britain | Feb. 16, 1933 |

OTHER REFERENCES

"Characteristics and Aircraft Applications of Wire Resistance Strain Gages," by A. V. de Forest, Instruments, vol. 15, April 1942, pages 112, 113, 114, 136 and 137.

Technical Notes, National Advisory Committee for Aeronautics, No. 744. "The Development of Electrical Strain Gages," by A. V. de Forest and H. Leaderman, published Jan. 1940. Page 27 is particularly relied upon as a reference.